Aug. 16, 1927.

A. J. BELLAMY 1,639,549

EGG PRESERVATION PROCESS AND PRODUCT THEREOF

Filed Sept. 2, 1925

INVENTOR
Archibald J. Bellamy
BY
ATTORNEYS

Patented Aug. 16, 1927.

1,639,549

UNITED STATES PATENT OFFICE.

ARCHIBALD JOHN BELLAMY, OF WOLVERHAMPTON, ENGLAND, ASSIGNOR, BY MESNE ASSIGNMENTS, TO EGG PATENTS LIMITED, OF LONDON, ENGLAND, A CORPORATION OF GREAT BRITAIN AND IRELAND.

EGG-PRESERVATION PROCESS AND PRODUCT THEREOF.

Application filed September 2, 1925, Serial No. 54,149, and in Great Britain May 13, 1925.

This invention relates to the preservation of eggs. Large quantities of eggs are produced in distant countries and as considerable time is taken to collect, pack and transport them, it is necessary that some means of preserving them from deterioration during this period be employed if they are to be fit for food when they reach the consumer. Heretofore the yolks of eggs have been removed from the shell and separated from the albumen and subsequently preserved by means of boric acid, but this is considered objectionable by medical officers of health and many members of the medical profession.

The object of the present invention therefore is to provide a harmless and effective means of preserving either the whole egg (after its removal from the shell) or only the yolk in a condition that will enable it to be used for the same purposes as a fresh egg.

I have found that glycerine is a suitable preservative if added to eggs and the mixture evaporated until it has the consistency of a pasty mass. Eggs treated in this way may be preserved for a considerable time in a condition from which they may be reconstituted when required for use by the addition of the proper proportion of water. Alternatively the preserved eggs may be mixed with any other suitable liquid or vehicle.

The partial evaporation may be effected by subjecting the mixture to the action of dry air to which it may be exposed in shallow trays. Or heat may be employed to eliminate the desired quantity of water but the temperature should not be so high as to coagulate the albumen or otherwise injure the material treated. Or the evaporation may be carried out at a low temperature in vacuo.

According to the present invention the glycerine mixed with the eggs preserves the residue (after the proper amount of the aqueous constituent has been removed) in a condition that enables it to be reconstituted by the addition of an equivalent amount of water which is impossible after the albumen has been allowed to coagulate.

The glycerine contained in the reconstituted egg is quite harmless and does not affect its flavour.

I have found that satisfactory results are obtained when from 2½% to 15% of glycerine is used, but I may use other proportions according to the amount of water in the whole egg or yolk.

I will now proceed to more particularly describe one mode of carrying out the improved process, with the aid of the accompanying drawings in which—

Figure 1:
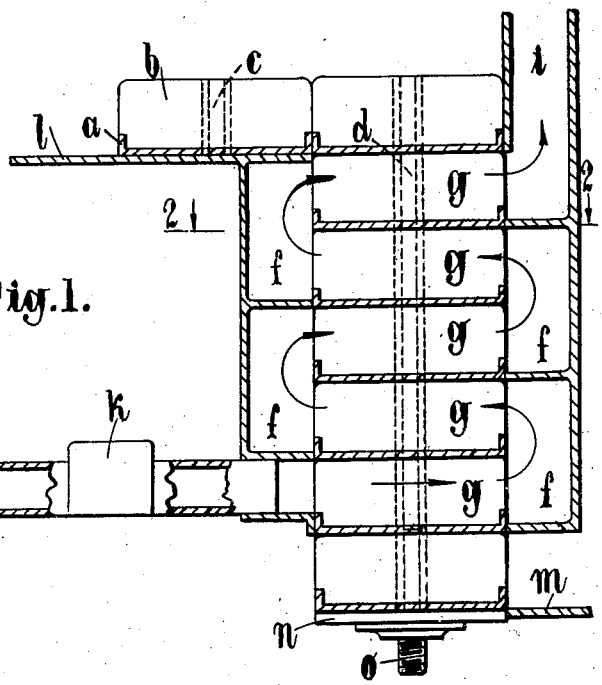
Figure 3:
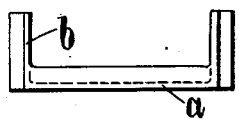
Figure 2:
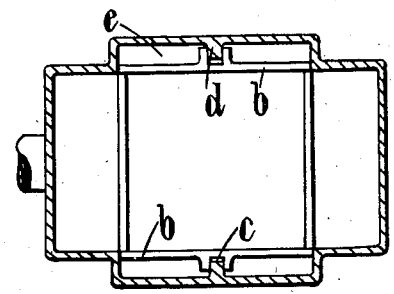

Fig. 1 is a vertical section through an evaporating apparatus employing dry air, Fig. 2 is a section in the plane indicated by the line 2—2 in Fig. 1 and Fig. 3 is a detail showing an end view of one of the trays.

In carrying out the improved process, the shells of the eggs are first removed and 10% of glycerine (which proportion may be varied as circumstances require) is added to the remainder of the eggs or the yolks alone. These are thoroughly mixed together in a mixing machine of any known kind.

The mixture is then poured into shallow trays $a$ which may be stacked one above the other so that dry air (preferably warmed) may pass between them.

These trays may have two deep sides $b$ to space them apart and be provided with grooves $c$ adapted to engage vertical guides $d$ supported at the sides of a well $e$ supplied with dry air through which the trays pass during the evaporating process.

Recesses $f$ are formed in the opposite walls of the well adjacent to the shallow sides of the trays to connect the spaces $g$ above the tray $a$ of each pair on one side and to connect the space above the upper tray of each pair with the space above the lower tray of the pair above it on the other side so that dry air derived from any convenient source $h$ may pass successively through the spaces $g$ between all the trays in the well and finally away through the flue $i$.

The air may pass through any suitable device $k$ of known kind for drying and heating it.

According to the arrangement shown in the drawings, the trays $a$ after being filled are slid along the table $l$ on to the sides $b$ of the top tray in the well $e$ through which they are lowered at a rate that will give time for the desired amount of moisture to be removed from the contents of each when it reaches the delivery table $m$ at the bottom of the well. I have found that satisfactory results are obtained when the quantity of water removed is such as to leave from 25% to 35% (by weight) in the residue. Doors (not shown) may be provided in the walls of the well *e* to enable access to be had to the trays for the purpose of agitating their contents and inspection during the process of evaporation.

Any suitable means of lowering the column of trays may be employed such as a rising and falling table *n* actuated by a screw *o*.

After the column has been lowered the tray above the bottom one is supported at the bottom of the well *e* by one or more bolts or any other suitable means (not shown) while the lowest tray is withdrawn from the bottom of the column, whereafter the table is again raised into a position to support the column of trays.

When smaller quantities of eggs are to be treated the mixture may be exposed to still dry air in shallow trays and occasionally agitated.

In a temperature of 65° Fahr. the desired amount of evaporation may be obtained in two or three days.

I wish it to be understood that I do not limit myself to the hereinbefore described means of evaporation which may be effected in vacuo or by any known means.

I claim:

1. A process for the preservation of eggs consisting of removing the shells and mixing the remainder with from 2½% to 15% of glycerine and evaporating the mixture until the residue contains not more than 35% (by weight) of moisture, substantially as described.

2. A process for the preservation of egg yolks comprising the mixing thereof with from 2½% to 15% of glycerine and concentrating the mixture until it has the consistency of a pasty mass substantially as described.

3. A process for the preservation of egg yolks comprising the mixing thereof with from 2½% to 15% of glycerine and dehydrating the mixture to at least such degree as to concentrate the mixture to a pasty mass.

4. A product comprising egg material associated with glycerine and dehydrated to at least such degree as to be concentrated to a pasty mass, and characterized by the fact that the glycerine is mixed, in proportions of from 2½% to 15%, with the egg material prior to dehydration.

In testimony whereof, I have signed my name to this specification at 61 and 62, Chancery Lane, London, this 29th day of July, 1925.

ARCHIBALD JOHN BELLAMY.